United States Patent [19]
Franke et al.

[11] Patent Number: 4,885,987

[45] Date of Patent: Dec. 12, 1989

[54] COFFEE FILTER RETAINER

[76] Inventors: Adrian R. Franke, P.O. Box 204, Minden, Nev. 89423; Harold L. Hull, 401 Canyon Way, Sp. 43, Sparks, Nev. 89431

[21] Appl. No.: 197,660

[22] Filed: May 23, 1988

[51] Int. Cl.4 ............................................. A47J 31/06
[52] U.S. Cl. ..................................... 99/295; 210/479
[58] Field of Search .............. 99/279, 295, 306, 280, 99/281, 282, 283, 323; 426/433; 210/478, 479, 480, 481, 474, 495, 471; 211/181; 55/379

[56] References Cited
U.S. PATENT DOCUMENTS

| | | | |
|---|---|---|---|
| 1,645,818 | 10/1927 | Overboe | 210/495 |
| 1,652,970 | 12/1927 | Workman | 210/495 |
| 3,388,804 | 6/1968 | Hester | 210/474 |
| 4,266,954 | 5/1981 | Dare | 55/379 |
| 4,656,932 | 4/1987 | Kopp | 99/295 |
| 4,735,719 | 4/1988 | Benedict | 99/295 |
| 4,738,696 | 4/1988 | Staffeld | 55/379 |

Primary Examiner—Robert W. Jenkins

[57] ABSTRACT

A device with several embodiments for securing a coffee filter in a coffee maker which will fit most commercially made coffee makers and which uses substantially all of the filter's surface for filtering purposes but does not allow the filter to fall inward on itself to allow coffee grounds to enter the brewed coffee container.

10 Claims, 1 Drawing Sheet

COFFEE FILTER RETAINER

BACKGROUND OF THE INVENTION

This invention relates to means to provide a retainer which fits inside the paper filter of a coffee filter receptacle to hold the paper filter walls in place against the supporting receptacle to prevent the collapse or folding over on itself of the paper filter which occurrence allows coffee grounds to find their way into the brewed coffee.

In the past, paper coffee filters have depended on the folds of the side walls of the filter to be of sufficient rigidity to support itself and lay against the walls of the filter receptacle, however, as the moisture of the hot water enters the filter, often times the filter will collapse as it becomes more pliable and can fold and lay upon itself allowing the coffee grounds to pass over the sides of the filter and enter the pot or vessel of the finished coffee thereby making an unsatisfactory situation as the brewed coffee now contains coffee grounds.

Sandrig in patent No. 4,728,425, addresses this problem by providing a filter apparatus which involves a custom made basket for holding an annular retainer which has a non-perforated, vertically extending wall portion with a plurality of openings adjacent to the retainer bottom edge for permitting liquid to and from within the confines of the retainer. It will readily be seen that this retainer will fit only it's own custom made basket and is not adaptable to fit coffee makers in general. Also this system allows filtration to occur only in designated places and does not use the entire surface of the filter which is available for filtering purposes.

The purpose of our invention is to provide a simple, effective means to hold the filter walls in an upright position by means of a universal retainer which is adaptable to most any coffee basket or apparatus.

A further purpose is to provide a simple retainer which allows all of the surface of the filter to be utilized for filtering purposes.

Still another purpose is to provide a filter retainer which is adjustable.

Another purpose is to provide a retainer which is sanitary and easily kept clean by conventional methods.

Other advantages and meritorious features of the present invention will be more fully understood from the following description of the drawings and the preferred embodiments, the claims and the detailed drawings which are described hereinbelow.

BRIEF DESCRIPTION OF THE DRAWINGS

FIG. I is a perspective view of a basket made of one piece of wire.

FIG. II is a side view of a basket in the form of a conical coil spring made of one piece of wire.

FIG. III is a top view of FIG. 11.

FIG. IV is a top view of an annular collapsible ring with cone shaped walls.

FIG. V is a perspective view of FIG. IV.

FIG. VI is a side view of FIG. IV.

DETAILED DESCRIPTION OF THE DRAWINGS

Figure 1:
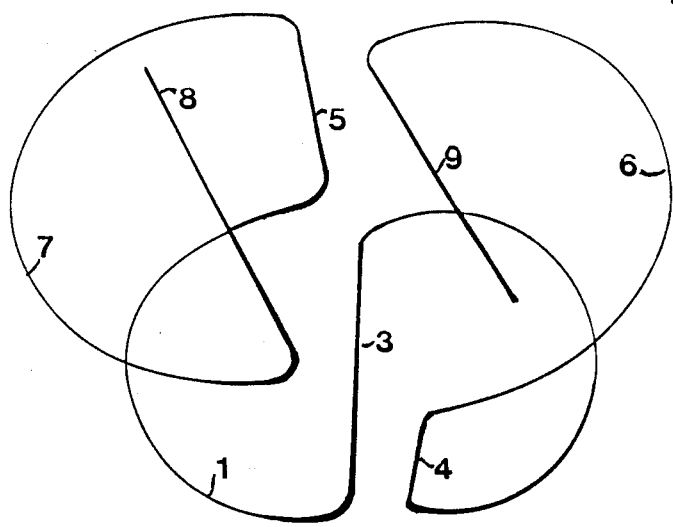
Figure 2:
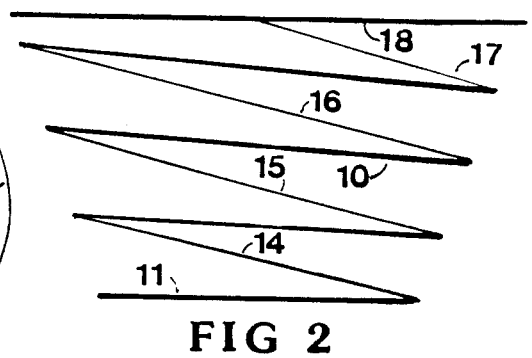
Figure 3:
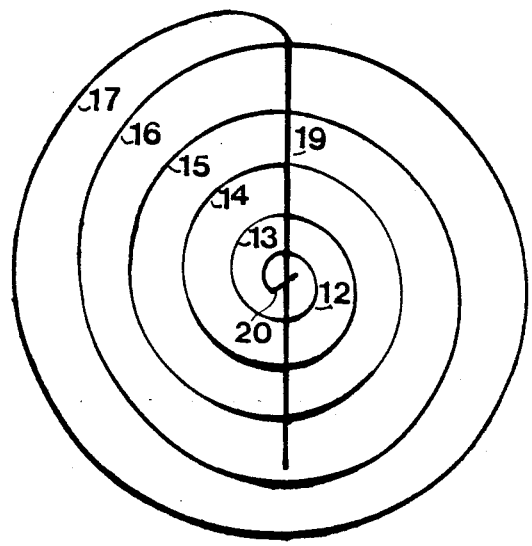
Figure 4:
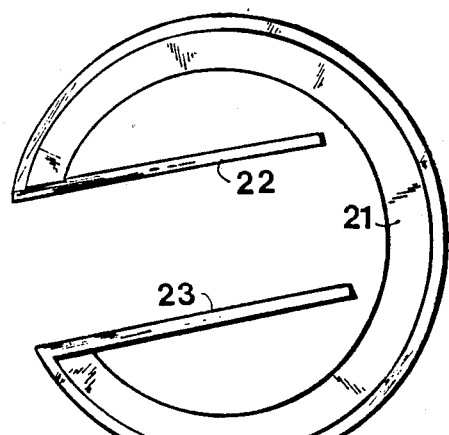
Figure 6:
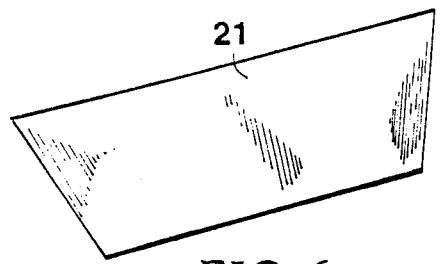
Figure 5:
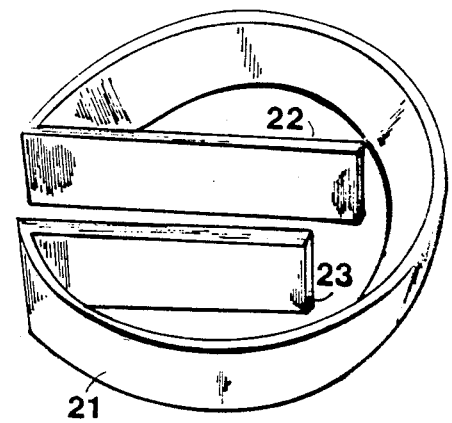

Referring now to the drawings, FIG. 1 is a retainer made of one continuous piece of wire or the like with 1 and 2 being half circles connected by cross member 3, forming and S, 6 and 7 being half circles connected to half circles 1 and 2 by substantially perpendicular members 4 and 5 and the ends of the continuous piece of wire terminated by substantially parallel cross members 8 and 9 with half circles 6 and 7 being substantially farther apart than half circles 1 and 2.

FIGS. II and III show a second form of the invention which is substantially a coiled cone spiral spring 10 with its bottom section 11 consisting of the beginning cross section 12 and several spiral coils 12, 13 and 14, these being in the same flat plane and comprising the bottom of the coil, while 15, 16 and 17 are spirals which rise from the flat plane 11, in concentric circles with each circle being larger than the previous circle until it reaches the last largest circle 18, said circle terminating with a cross section 19 which forms a handle, and this cone shaped coil due to its configuration, being collapsable into a substantially flat plane for packaging purposes.

FIGS. IV, V and VI show a third embodiment of this invention which is an annular, partial ring section 21 of a cone with its ends 22 and 23 terminating inwardly and substantially parallel and being made of a material which has a memory such as thermal plastic that allows the section to be squeezed together to form a smaller cone section, but when released will return to its natural expanded state.

Referring now again to FIG. 1, which is the preferred embodiment of the invention, it will be seen that when the two cross members 8 and 9 are squeezed together, that the two half circles 6 and 7 approach each other to form a circle whose diameter is nearer that of half circles 1 and 2 and allows the retainer to be set into the inside of a paper filter or a coffee maker with out touching the walls of the paper filter until the retainer is released at which time the two half circles 8 and 9 return to their naturally expanded state and nudge the paper filter against the walls of its receptacle and holds the filter in place during the coffee making process and does not allow the filter to fall inward upon itself, which would allow coffee grounds to enter the brewed section of the coffee maker.

Referring again to FIGS. II and III, it will be seen that when this embodiment of our invention is grasped by the handle 19 it may easily be set into a paper filter and when the coil is firmly in place will cause the paper filter to nudge against its receptacle thus supporting the paper against the walls of its receptacle and not allowing it to collapse inward upon itself.

It will also be seen that when this embodiment is forced and collapsed downward upon itself that it forms a substantially flat plane which makes it easily packaged and when taken out of its package will assume its natural state of a cone spiral coil.

It will also be noted that both the first and second embodiments as depicted by FIGS. I, II and III can be made of spring wire which may be plated to prevent rusting and the like and which will not taint the taste of the coffee.

Also both embodiments may be manufactured by any major spring company with a minimum amount of tooling and which makes the product cost effective.

Referring once again to FIGS. IV, V and VI, this embodiment shows a collapsible, cone shaped section 21 made of thermal plastic or the like, with a memory and which when squeezed together by ends 22 and 23 becomes smaller in circumference allowing it to be set into the top portion of a paper filter and when released forces the top portion of the paper filter against the walls of its receptacle when said section returns to its natural state.

It will be noted that this embodiment is readily manufactured out of a number of memory retaining thermal plastics by injection molding for mass production and is very cost effective after a modest tooling cost.

It will now be noted that all three embodiments holds the paper filter in an upright position and are adaptable to most coffee apparatus.

It will also be noted that all three embodiments allow most of the surface of the paper filter to be utilized for filtering purposes.

It will be noted also that two of the three embodiments are adjustable.

It is also obvious that all three embodiments may be easily kept clean by conventional methods.

Having described our invention, what we claim as new and desire to secure by letters patent is:

1. A coffee filter retainer formed from a wire, said wire having a memory, with said retainer having a first position and a second position, said retainer being independent of but cooperating with, a coffee filter and a coffee filter basket said basket having walls, with said first position of said retainer formed to substantially conform to the inside contours of said coffee filter, when said coffee filter is placed inside of said coffee filter basket, and said retainer when compressed into its said second position being smaller than when in its said first position allowing said retainer to fit inside of said coffee filter, with said retainer when released from its said second position, returning to its said first position to force said coffee filter against the said walls of said coffee filter basket, securely retaining said coffee filter in said coffee filter basket.

2. The device of claim 1 in which said wire is made of a non-corrosive and sanitary material.

3. The device of claim 2 in which the said non-corrosive and sanitary material is stainless steel.

4. The device of claim 1 in which said wire is of a continuous, single length.

5. The device of claim 1 in which the said retainer formed from a wire, is comprised of:
   (a) a base, formed by a pair of half-circles, said half-circles being substantially the size of the bottom portion of said coffee filter when said coffee filter is placed inside of said coffee filter basket and connected together by a cross member, forming substantially an S shape;
   (b) a first and second outward biased, support members connected to said first pair of half-circles at their distal ends opposite from said cross member, said sections lying in substantially a plane including and being substantially the same height as said walls of said coffee filter basket and
   (c) a second pair of half-circles, forming a substantially annular shape with said second pair of half-circles being substantially the size of the upper portion of said coffee filter when said coffee filter is placed inside of said coffee filter basket, and connected at one of their ends, respectively, to the upper ends of said sections, respectively, and the distal ends of said second pair of half-circles terminating in two parallel cross-sections, said cross-sections being spaced far enought apart so that when compressed together in close proximity, said retainer will form said second position.

6. A coffee filter retainer formed from a wire, said wire having a memory, with said retainer having a first position and a second position, said retainer being independent of but cooperating with, a coffee filter and a coffee filter basket, with said first position of said retainer formed to substantially conform to the inside contours of said coffee filter, when said coffee filter is placed inside of said coffee filter basket, and said retainer when compressed into its said second position lying in a flat plane.

7. The device of claim 6 in which said wire is made of a non-corrosive and sanitary material.

8. The device of claim 7 in which the said non-corrosive and sanitary material is stainless steel.

9. The device of claim 6 in which said wire is of a continuous, single length.

10. The device of claim 6 in which the said retainer formed from a wire forming its said first position, is comprised of;
   (a) a base, formed of one or more increasingly larger concentric circles with the largest circle being of substantially the size of the lower portion of said coffee filter when said coffee filter is inserted into said coffee basket, said concentric circle(s) being in a substantially flat plane;
   (b) one or more increasingly larger, vertically rising concentric circles, of which the smallest is connected to the said base and forming substantially the shape of the walls of the said coffee filter when said coffee filter is placed inside of said coffee filter basket, with the said last, largest, vertically rising, concentric cirle being substantially the same size as the upper portion of said coffee filter when said coffee filter is placed inside of said coffee filter basket, and
   (c) a handle, formed by crossing substantially the center of the said last, largest, vertically rising, concentric cirle, with its terminating end.

* * * * *